United States Patent
Taylor et al.

(10) Patent No.: US 11,635,023 B1
(45) Date of Patent: Apr. 25, 2023

(54) MULTI-SPOOL CO2 AIRCRAFT POWER SYSTEM FOR OPERATING MULTIPLE GENERATORS

(71) Applicant: Hamilton Sundstrand Corporation, Charlotte, NC (US)

(72) Inventors: Stephen H. Taylor, East Hartford, CT (US); Malcolm P. MacDonald, Bloomfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/715,156

(22) Filed: Apr. 7, 2022

(51) Int. Cl.
  *F02C 6/18* (2006.01)
  *F02C 7/224* (2006.01)
  *F01D 15/10* (2006.01)

(52) U.S. Cl.
  CPC ............ *F02C 6/18* (2013.01); *F01D 15/10* (2013.01); *F02C 7/224* (2013.01); *F05D 2210/12* (2013.01); *F05D 2220/323* (2013.01); *F05D 2220/62* (2013.01); *F05D 2260/10* (2013.01); *F05D 2260/213* (2013.01); *F05D 2260/232* (2013.01)

(58) Field of Classification Search
  CPC ...... F02C 6/18; F02C 1/04; F02C 1/06; F02C 7/224; F01K 23/10; F01D 15/10; F05D 2210/12; F05D 2220/323; F05D 2220/62; F05D 2260/10; F05D 2260/213; F05D 2260/232
  See application file for complete search history.

(56) References Cited

U.S. PATENT DOCUMENTS

| | | | |
|---|---|---|---|
| 9,982,629 B2 | 5/2018 | Armstrong et al. | |
| 10,101,092 B2 | 10/2018 | Stapp et al. | |
| 10,458,364 B2 | 10/2019 | Armstrong et al. | |
| 10,584,635 B2 | 3/2020 | Armstrong et al. | |
| 10,947,897 B2 | 3/2021 | Sane | |
| 11,225,905 B1 | 1/2022 | Holley et al. | |
| 11,230,948 B2 * | 1/2022 | McAuliffe | F02C 6/18 |
| 2013/0042601 A1 * | 2/2013 | Kraft | F01K 27/00 60/407 |
| 2016/0053638 A1 * | 2/2016 | Stapp | F28D 21/0003 60/671 |
| 2018/0252158 A1 * | 9/2018 | Malkamäki | F02C 1/06 |
| 2020/0224557 A1 | 7/2020 | Mcauliffe et al. | |
| 2020/0224588 A1 | 7/2020 | Somanath et al. | |
| 2020/0224590 A1 | 7/2020 | Mcauliffe et al. | |
| 2021/0301720 A1 * | 9/2021 | Staubach | F02C 7/141 |

* cited by examiner

*Primary Examiner* — Todd E Manahan
*Assistant Examiner* — Rodolphe Andre Chabreyrie
(74) *Attorney, Agent, or Firm* — Cantor Colburn LLP (57) ABSTRACT

A $CO_2$ bottoming cycle system includes a first compressor operatively connected to a first turbine through a first shaft. A first generator is operatively connected to the first shaft. A second compressor is fluidically connected to the first compressor. The second compressor is operatively connected to a second turbine through a second shaft. A second generator is operatively connected to the second shaft. The first turbine is fluidically connected to the second turbine.

20 Claims, 7 Drawing Sheets

MULTI-SPOOL CO2 AIRCRAFT POWER SYSTEM FOR OPERATING MULTIPLE GENERATORS

STATEMENT OF FEDERAL SUPPORT

This invention was made with government support under DE-AR0001342 awarded by the Department of Energy. The government has certain rights in the invention.

BACKGROUND

Exemplary embodiments pertain to the art of aircraft and, more particularly, to a multi-spool, multi-shaft $CO_2$ power system for operating multiple generators in an aircraft.

Many Economic and regulatory environments continue to drive the need for dramatic improvements in overall fuel efficiency in commercial aviation. A bottoming cycle utilizing $CO_2$ as the working fluid can reclaim heat from engine exhaust, producing power that offsets the demand on the engine, reducing fuel burn requirements. In this invention, the $CO_2$ bottoming cycle drives generators, producing electrical power, which may be used in various ways, including directly assisting the engine. The high rotational speeds required for the $CO_2$ compressors and turbines present technical challenges for generator design. Generator design becomes more feasible with reduction in rotational speed and/or reduction in the size of the generator.

Creating a single-spool compressor/turbine system that can operate at the required pressure ratio and flow rates to produce the power level desired is not currently feasible. A single generator that operates at the speed of the $CO_2$ machines and extracts the power level desired is very difficult with current technology.

BRIEF DESCRIPTION

Disclosed in accordance with a non-limiting example is a $CO_2$ bottoming cycle system including a first compressor operatively connected to a first turbine through a first shaft. A first generator is operatively connected to the first shaft. A second compressor is fluidically connected to the first compressor. The second compressor is operatively connected to a second turbine through a second shaft. A second generator is operatively connected to the second shaft. The first turbine is fluidically connected to the second turbine.

Additionally, or alternatively, in this or other non-limiting examples, a third compressor fluidically connected to the second compressor, the third compressor being operatively connected to a third turbine through a third shaft, wherein the second turbine is fluidically connected to the third turbine.

Additionally, or alternatively, in this or other non-limiting examples, a $CO_2$ recuperator including a first inlet and a first outlet, and a second inlet and a second outlet, the first inlet being fluidically connected to the third compressor and the second inlet being fluidically connected to the first turbine.

Additionally, or alternatively, in this or other non-limiting examples, an exhaust heat exchanger including an inlet portion fluidically connected to the first outlet of the $CO_2$ recuperator and an outlet portion fluidically connected to the third turbine.

Additionally, or alternatively, in this or other non-limiting examples, a first ram air heat exchanger including a first heat exchanger inlet fluidically connected to the second outlet of the $CO_2$ recuperator and a first heat exchanger outlet fluidically connected to the first compressor.

Additionally, or alternatively, in this or other non-limiting examples, a second ram air heat exchanger including a second heat exchanger inlet fluidically connected to the first compressor and a second heat exchanger outlet fluidically connected to the second compressor.

Additionally, or alternatively, in this or other non-limiting examples, a third ram air heat exchanger having a third heat exchanger inlet fluidically connected to the second compressor and a third heat exchanger outlet fluidically connected to the third compressor.

Additionally, or alternatively, in this or other non-limiting examples, the first compressor includes a first compressor pressure ratio, the second compressor includes a second compressor pressure ratio, and the third compressor includes a third compressor pressure ratio.

Additionally, or alternatively, in this or other non-limiting examples, the first turbine includes a first turbine pressure ratio, the second turbine includes a second turbine pressure ratio, and the third turbine includes a third turbine pressure ratio.

Additionally, or alternatively, in this or other non-limiting examples, a fuel heat exchanger fluidically connected to the $CO_2$ recuperator.

Disclosed in connection with another non-limiting example is an aircraft system including a compressor portion and a turbine portion operatively connected to the compressor portion through a shaft. The turbine portion includes a turbine exhaust. A combustor is fluidically connecting the compressor portion and the turbine portion. A $CO_2$ bottoming cycle includes a first compressor operatively connected to a first turbine through a first shaft, a first generator operatively connected to the first shaft, and a second compressor fluidically connected to the first compressor. The second compressor is operatively connected to a second turbine through a second shaft. A second generator is operatively connected to the second shaft. The first turbine is fluidically connected to the second turbine. An exhaust heat exchanger in a heat exchange relationship with the turbine exhaust.

Additionally, or alternatively, in this or other non-limiting examples, a third compressor fluidically connected to the second compressor, the third compressor being operatively connected to a third turbine through a third shaft, wherein the second turbine is fluidically connected to the third turbine.

Additionally, or alternatively, in this or other non-limiting examples, a $CO_2$ recuperator including a first inlet and a first outlet, and a second inlet and a second outlet, the first inlet being fluidically connected to the third compressor and the second inlet being fluidically connected to the first turbine.

Additionally, or alternatively, in this or other non-limiting examples, the exhaust heat exchanger includes an inlet portion fluidically connected to the first outlet of the $CO_2$ recuperator and an outlet portion fluidically connected to the third turbine.

Additionally, or alternatively, in this or other non-limiting examples, a first ram air heat exchanger including a first heat exchanger inlet fluidically connected to the second outlet of the $CO_2$ recuperator and a first heat exchanger outlet fluidically connected to the first compressor.

Additionally, or alternatively, in this or other non-limiting examples, a second ram air heat exchanger including a second heat exchanger inlet fluidically connected to the first compressor and a second heat exchanger outlet fluidically connected to the second compressor.

Additionally, or alternatively, in this or other non-limiting examples, a third ram air heat exchanger having a third heat exchanger inlet fluidically connected to the second compressor and a third heat exchanger outlet fluidically connected to the third compressor.

Additionally, or alternatively, in this or other non-limiting examples, the first compressor includes a first compressor pressure ratio, the second compressor includes a second compressor pressure ratio, and the third compressor includes a third compressor pressure ratio.

Additionally, or alternatively, in this or other non-limiting examples, the first turbine includes a first turbine pressure ratio, the second turbine includes a second turbine pressure ratio, and the third turbine includes a third turbine pressure ratio.

Additionally, or alternatively, in this or other non-limiting examples, a fuel heat exchanger fluidically connected to the CO2 recuperator.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
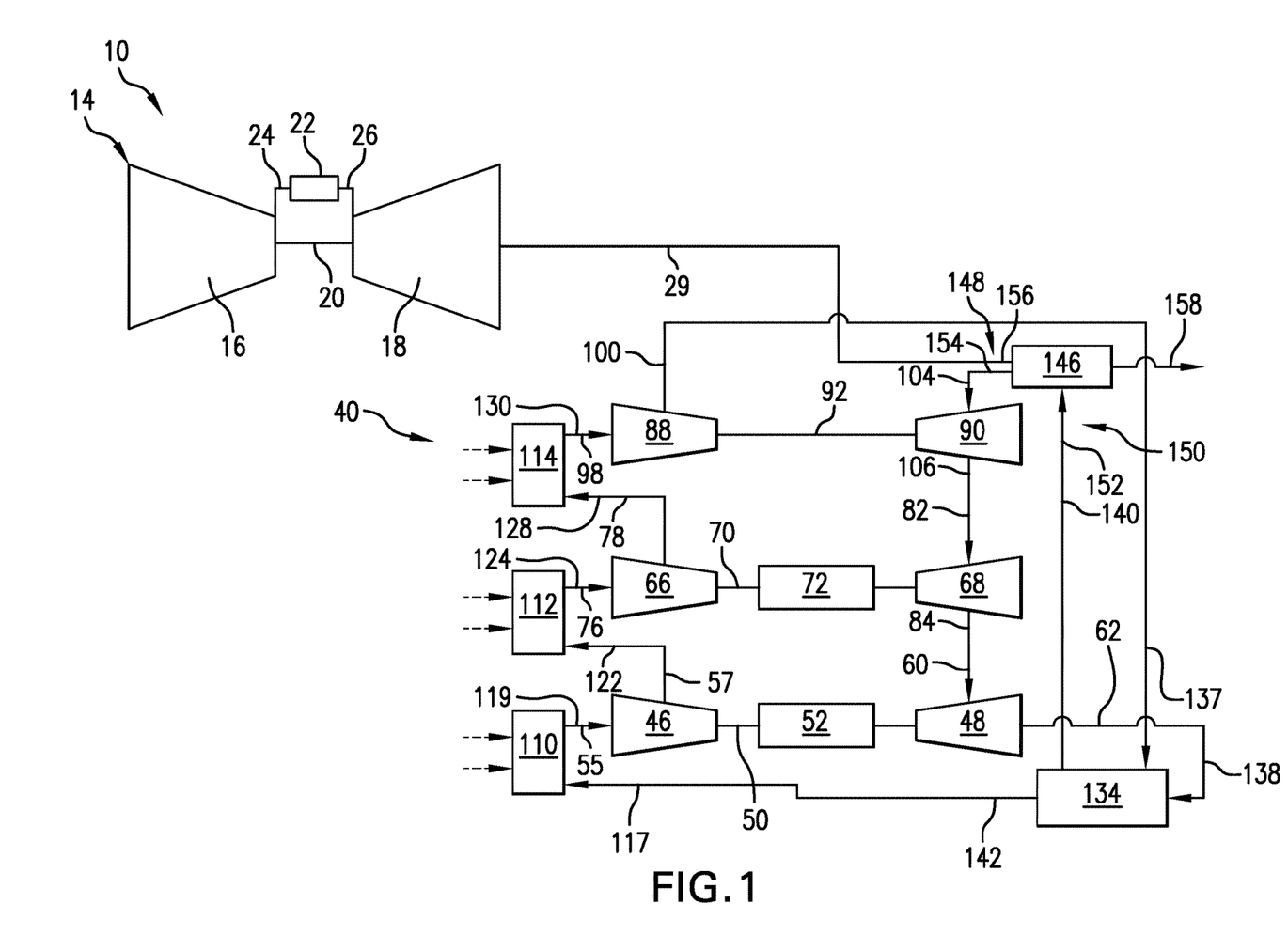
FIG. 1 is a schematic view of an aircraft system including a multi-spool CO2 bottoming system, in accordance with a non-limiting example.

An aircraft system, in accordance with a non-limiting example, is indicated generally at 10 in the figure. Aircraft system 10, when operated, provides power to support flight operations as well as electrical power to support various on-board aircraft systems. In a non-limiting example, aircraft system 10 includes an air-breathing turbine engine 14 including a compressor portion 16 connected to a turbine portion 18 through a shaft 20. A combustor 22 is fluidically connected between compressor portion 16 and turbine portion 18.

Combustor 22 includes an inlet 24 fluidically connected to compressor portion 16 and an outlet 26 fluidically connected to turbine portion 18. Combustor 22 receives air from compressor portion 16 and delivers hot gases into turbine portion 18 to create motive power. Turbine portion 18 includes an exhaust outlet 29. At this point, it should be understood that the number of air breathing turbine engines in an aircraft may vary.

In a non-limiting example, aircraft system 10 also includes a CO2 bottoming cycle 40. As will be discussed herein, CO2 bottoming cycle 40 extracts heat from exhaust gases passing from turbine portion 18 to generate electrical power for the aircraft. In a non-limiting example, CO2 bottoming cycle 40 includes a first compressor 46 operatively coupled to a first turbine 48 through a first shaft 50. A first generator 52 includes a first power rating and is operatively connected to, e.g., driven by, first shaft 50. While shown as being arranged between first compressor 46 and first turbine 48, the particular location of first generator 52 may vary. In a non-limiting example, first compressor 46 includes a first inlet 55 and a first outlet 57. First turbine 48 includes a first inlet portion 60 and a first outlet portion 62.

In a non-limiting example, CO2 bottoming cycle 40 also includes a second compressor 66 operatively connected to a second turbine 68 through a second shaft 70. A second generator 72 includes a second power rating and is operatively connected, e.g., driven by, second shaft 70. In a non-limiting example, the first power rating of first generator 52 is substantially identical to the second power rating of second generator 72. While shown as being arranged between second compressor 66 and second turbine 68, the particular location of second generator 72 may vary. Second compressor 66 includes a second inlet 76 and a second outlet 78. Second turbine 68 includes a second inlet portion 82 and a second outlet portion 84. In a non-limiting example, CO2 bottoming cycle 40 includes a third compressor 88 operatively connected to a third turbine 90 through a third shaft 92. Third compressor 88 includes a third inlet 98 and a third outlet 100. Third turbine 90 includes a third inlet portion 104 and a third outlet portion 106.

In a non-limiting example, first compressor 46 includes a first compressor pressure ratio, second compressor 66 includes a second compressor pressure ratio, and third compressor 88 includes a third compressor pressure ratio. In a non-limiting example, each of the first, second, and third compressor pressure ratios are substantially similar. In a non-limiting example, first turbine 48 includes a first turbine pressure ratio, second turbine 68 includes a second turbine pressure ratio, and third turbine 90 includes a third turbine pressure ratio. First, second, and third turbine pressure ratios are substantially similar in accordance with a non-limiting example.

In a non-limiting example, aircraft system 10 includes a first ram air system 110, a second ram air system 112, and a third ram air system 114. Each ram air system is a heat exchanger that employs forced air generated during flight to remove heat from CO2 flowing through CO2 bottoming cycle 40. While shown as three separate systems, first, second, and third ram air systems 110, 112, and 114 may be integrated into a single unit. While shown and described as employing three ram air systems, it should be understood that the number and arrangement of ram air systems may vary.

First ram air system 110 includes a first ram air inlet 117 and a first ram air outlet 119. Second ram air system 112 includes a second ram air inlet 122 and a second ram air outlet 124. Third ram air system 114 includes a third ram air inlet 128 and a third ram air outlet 130. At this point, it should be understood that while described as using ram air, air systems 110, 112, and 114 may use a variety of heat exchange mediums including fan air coming from, for example, air breathing turbine engine 14.

In a non-limiting example, aircraft system 10 also includes a CO2 recuperator 134. As will be detailed more fully herein, CO2 recuperator 134 is an energy recovery heat exchanger that employs CO2 as a working fluid. In a non-limiting example, CO2 recuperator 134 includes a first recuperator inlet 137 and a second recuperator inlet 138. CO2 recuperator 134 also includes a first recuperator outlet 140 and a second recuperator outlet 142.

Aircraft system 10 is further shown to include an exhaust heat exchanger 146 in accordance with a non-limiting example. Exhaust heat exchanger 146 includes a first circuit 148 that includes exhaust gases passing from turbine portion 18 as a working fluid and a second circuit 150 that includes CO2 passing through CO2 recuperator 134 as a working fluid. Second circuit 150 includes a CO2 inlet 152 fluidically connected to first recuperator outlet 140 and a CO2 outlet 154 fluidically connected to first recuperator inlet 137. First circuit 148 includes an exhaust gas inlet 156 fluidically connected to turbine exhaust outlet 29 and an exhaust gas outlet 158 that may be connected to a nozzle, other device, or the ambient.

In a non-limiting example, CO2 passing through CO2 recuperator exchanges heat with exhaust gases from turbine portion 18 flowing through exhaust heat exchanger 146. The CO2 from exhaust heat exchanger 146 passes from CO2 outlet 154 and flows to third inlet portion 104 and is expanded in third turbine 90. CO2 passes through third outlet portion 106 and into second inlet section 82 to be expanded in second turbine 68. The CO2 then passes from second outlet portion 84 of second turbine 68 into first inlet portion 60 to be expanded in first turbine 48. First outlet portion 62 is then fluidically connected to second recuperator inlet 138.

In a non-limiting example, second recuperator outlet 142 is fluidically connected to first ram air system 110. CO2 passing from CO2 recuperator 134 is passed in a heat exchange relationship with air passing through first ram air system 110. The CO2 exits first ram air system 110 and is compressed in first compressor 46. The CO2 passes from first outlet 57 into second ram air system 112 before being compressed in second compressor 66. The CO2 passes from second outlet 78 into third ram air system 114 before being compressed in third compressor 88 and passed back to CO2 recuperator 134 first recuperator inlet 137 forming a closed loop system.

In a non-limiting example, work extracted from the CO2 in first turbine 48 drives first generator 52 and work extracted from the CO2 in second turbine 68 drives second generator 72. Driving multiple generators via different shafts allows the system to meet desired power output without the need to drive a single large generator, which is prohibitively difficult to design at the speed and power level desired. Furthermore, staging the compression and expansion of the CO2 across multiple compressors and turbines respectively facilitates the operation of the cycle at an optimal overall pressure ratio (highest pressure in the cycle divided by lowest pressure in the cycle), which could not be achieved in a single compressor.

Figure 2:
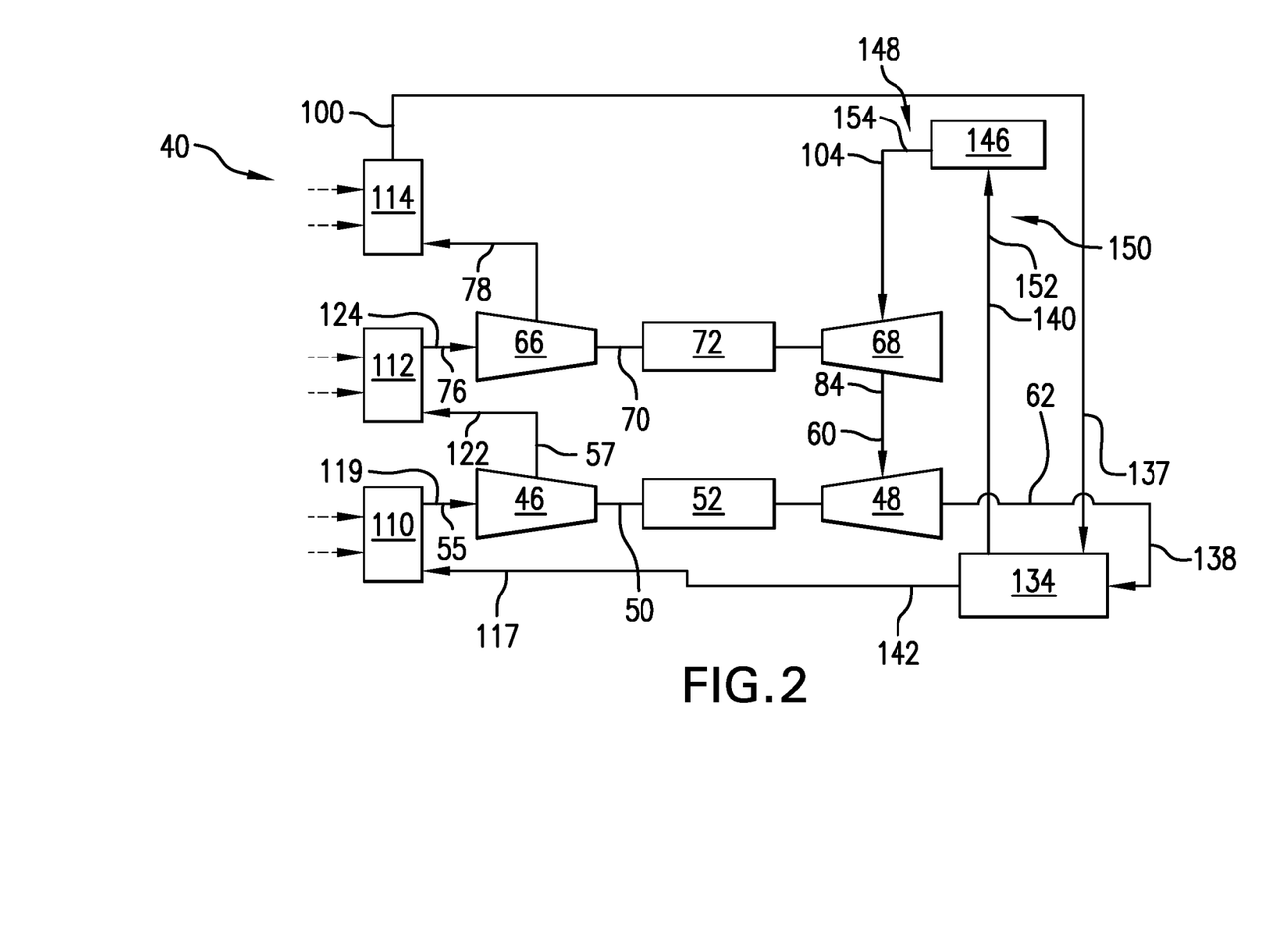
FIG. 2 is a schematic view of the multi-spool CO2 bottoming system, in accordance with another non-limiting example.
Figure 3:
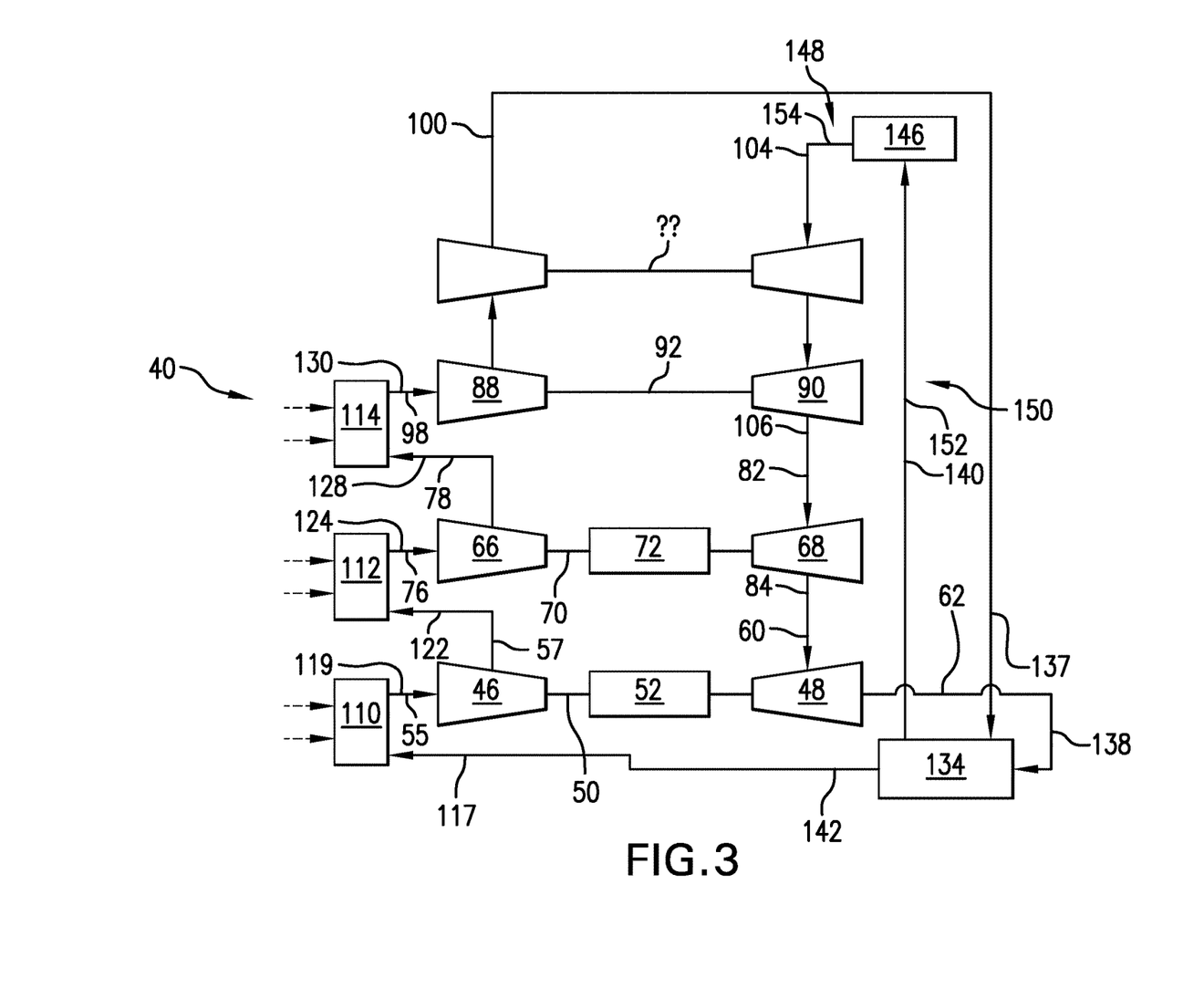
FIG. 3 is a schematic view of the multi-spool CO2 bottoming system, in accordance with yet another non-limiting example.
Figure 4:
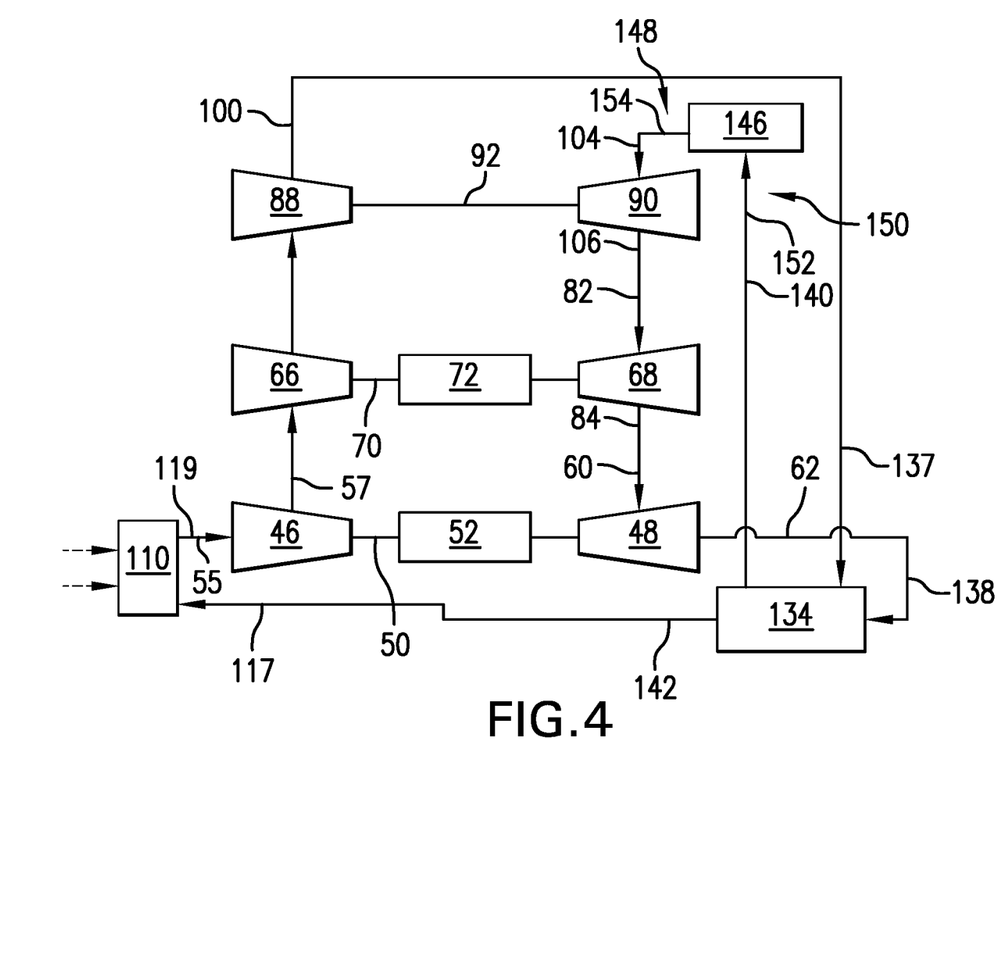
FIG. 4 is a schematic view of the multi-spool CO2 bottoming system, in accordance with still another non-limiting example.
Figure 5:
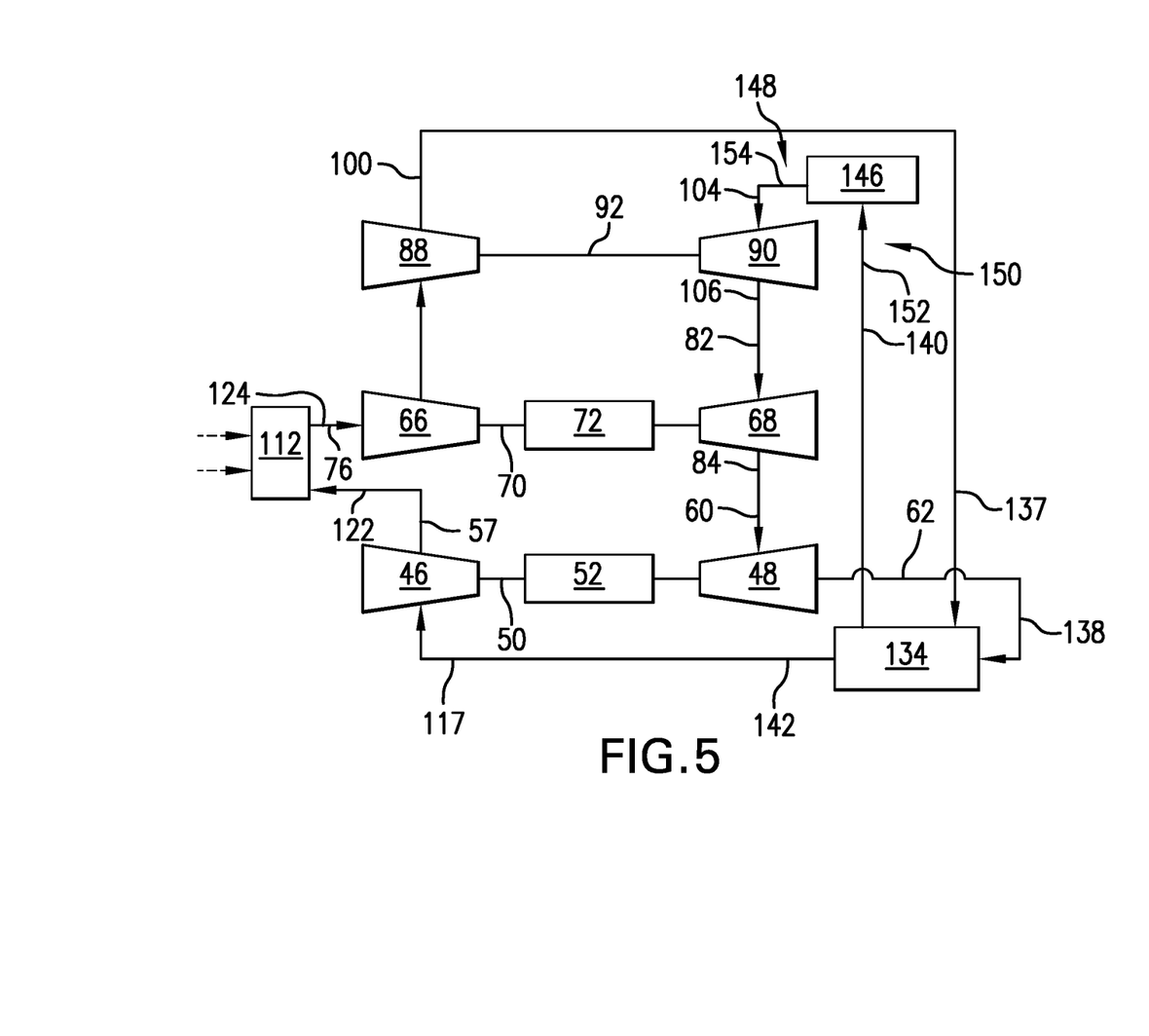
FIG. 5 is a schematic view of the multi-spool CO2 bottoming system, in accordance with yet still another non-limiting example.
Figure 6:
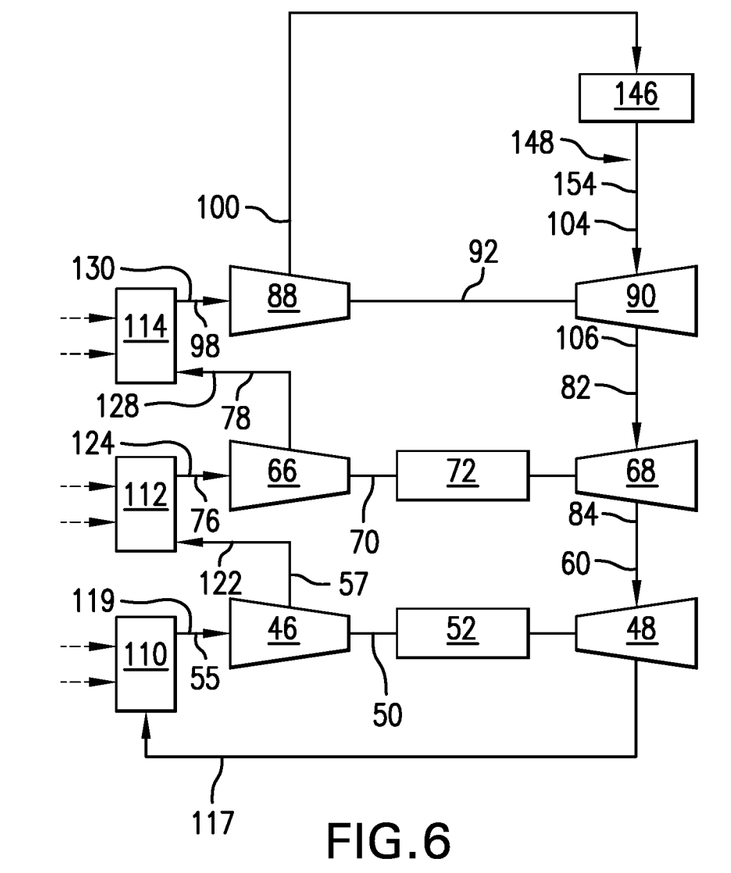
FIG. 6 is a schematic view of the multi-spool CO2 bottoming system, in accordance with still yet another non-limiting example.
Figure 7:
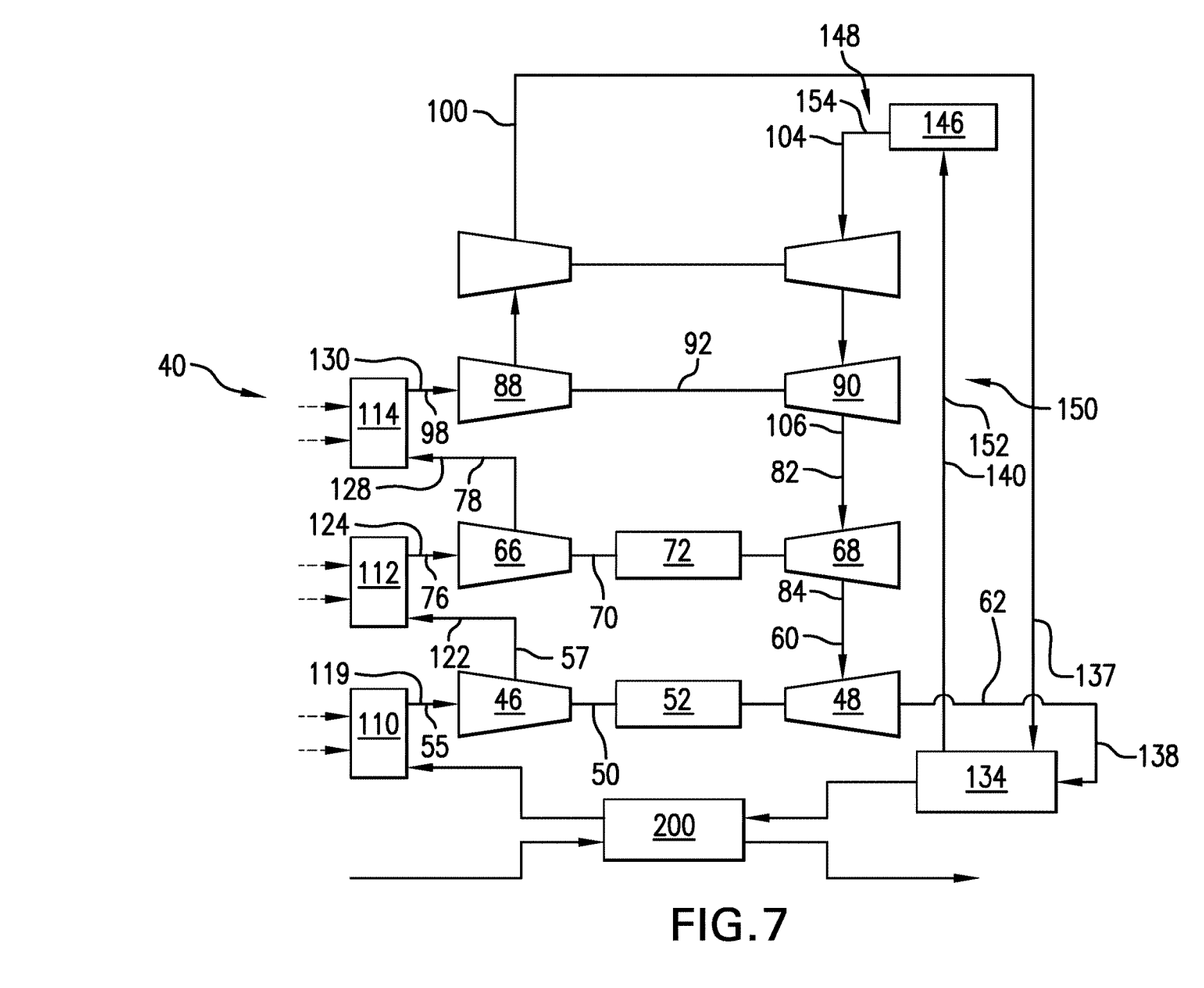
FIG. 7 is a schematic view of the multi-spool CO2 bottoming system, in accordance with another non-limiting example.

At this point, it should be understood that the CO2 bottoming cycle shown in FIG. 1 is but one non-limiting example of a system for driving multiple generators to provide a selected power output, other arrangements of components are also envisioned such as shown in FIGS. 2-7 wherein like reference numbers represent corresponding parts in the respective views. For example, the number of compressors/turbines may vary as shown in FIGS. 2 and 3. FIGS. 4 and 5 depicts different arrangements of ram air systems in accordance with non-limiting examples. FIG. 6 depicts the CO2 bottoming cycle without a recuperator in accordance with a non-limiting example. FIG. 7 depicts the incorporation of a fuel heat exchanger 200 into the CO2 bottoming cycle, in accordance with a non-limiting example.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A CO2 bottoming cycle system using a CO2 working fluid comprising:
a first compressor operatively connected to a first turbine having a first turbine pressure ratio through a first shaft;
a first generator operatively connected to the first shaft;
a second compressor fluidically connected to the first compressor, the second compressor being operatively connected to a second turbine having a second turbine pressure ratio through a second shaft, the second turbine pressure ratio being substantially similar to the first turbine pressure ratio, wherein the second turbine is fluidically connected, in series, to the first turbine; and
a second generator operatively connected to the second shaft, wherein the first turbine is fluidically connected to the second turbine.

2. The CO2 bottoming cycle system according to claim 1, further comprising: a third compressor fluidically connected to the second compressor, the third compressor being operatively connected to a third turbine through a third shaft, wherein the second turbine is fluidically connected, in series, to the third turbine.

3. The CO2 bottoming cycle system according to claim 2, further comprising: a CO2 recuperator including a first inlet and a first outlet, and a second inlet and a second outlet, the first inlet being fluidically connected to the third compressor and the second inlet being fluidically connected to the first turbine.

4. The CO2 bottoming cycle system according to claim 3, further comprising: an exhaust heat exchanger including an inlet portion fluidically connected to the first outlet of the CO2 recuperator and an outlet portion fluidically connected to the third turbine.

5. The CO2 bottoming cycle system according to claim 3, further comprising: a first ram air heat exchanger including a first heat exchanger inlet fluidically connected to the second outlet of the CO2 recuperator and a first heat exchanger outlet fluidically connected to the first compressor.

6. The CO2 bottoming cycle system according to claim 5, further comprising: a second ram air heat exchanger including a second heat exchanger inlet fluidically connected to the first compressor and a second heat exchanger outlet fluidically connected to the second compressor.

7. The CO2 bottoming cycle system according to claim 6, further comprising: a third ram air heat exchanger having a third heat exchanger inlet fluidically connected to the second compressor and a third heat exchanger outlet fluidically connected to the third compressor.

8. The CO2 bottoming cycle system according to claim 2, wherein the first compressor includes a first compressor pressure ratio, the second compressor includes a second compressor pressure ratio, and the third compressor includes a third compressor pressure ratio.

9. The CO2 bottoming cycle system according to claim 8, wherein the third turbine includes a third turbine pressure ratio that is substantially similar to the first turbine pressure ratio and the second turbine pressure ratio.

10. The CO2 bottoming cycle system according to claim 3, further comprising: a fuel heat exchanger fluidically connected to the CO2 recuperator.

11. An aircraft system comprising:
a compressor portion;
a turbine portion operatively connected to the compressor portion through a shaft, the turbine portion including a turbine exhaust;
a combustor fluidically connecting the compressor portion and the turbine portion; and
a CO2 bottoming cycle using a CO2 working fluid including:
a first compressor operatively connected to a first turbine having a first turbine pressure ratio through a first shaft;
a first generator operatively connected to the first shaft;
a second compressor fluidically connected to the first compressor, the second compressor being operatively connected to a second turbine having a second turbine pressure ratio through a second shaft, the second turbine pressure ratio being substantially similar to the first turbine pressure ratio wherein the second turbine is fluidically connected, in series, to the first turbine;
a second generator operatively connected to the second shaft, wherein the first turbine is fluidically connected to the second turbine; and
an exhaust heat exchanger in a heat exchange relationship with the turbine exhaust.

12. The aircraft system according to claim 11, further comprising: a third compressor fluidically connected to the second compressor, the third compressor being operatively connected to a third turbine through a third shaft, wherein the second turbine is fluidically connected, in series, to the third turbine.

13. The aircraft system according to claim 12, further comprising: a CO2 recuperator including a first inlet and a first outlet, and a second inlet and a second outlet, the first inlet being fluidically connected to the third compressor and the second inlet being fluidically connected to the first turbine.

14. The aircraft system according to claim 13, wherein the exhaust heat exchanger includes an inlet portion fluidically connected to the first outlet of the CO2 recuperator and an outlet portion fluidically connected to the third turbine.

15. The aircraft system according to claim 13, further comprising: a first ram air heat exchanger including a first heat exchanger inlet fluidically connected to the second outlet of the CO2 recuperator and a first heat exchanger outlet fluidically connected to the first compressor.

16. The aircraft system according to claim 15, further comprising: a second ram air heat exchanger including a second heat exchanger inlet fluidically connected to the first compressor and a second heat exchanger outlet fluidically connected to the second compressor.

17. The aircraft system according to claim 16, further comprising: a third ram air heat exchanger having a third heat exchanger inlet fluidically connected to the second compressor and a third heat exchanger outlet fluidically connected to the third compressor.

18. The aircraft system according to claim 12, wherein the first compressor includes a first compressor pressure ratio, the second compressor includes a second compressor pressure ratio, and the third compressor includes a third compressor pressure ratio.

19. The aircraft system according to claim 18, wherein the third turbine includes a third turbine pressure ratio that is substantially similar to the first turbine pressure ratio and the second turbine pressure ratio.

20. The aircraft system according to claim 13, a fuel heat exchanger fluidically connected to the CO2 recuperator.

* * * * *